(12) United States Patent
Uehara

(10) Patent No.: US 11,661,971 B2
(45) Date of Patent: May 30, 2023

(54) DAMPER DEVICE

(71) Applicant: EXEDY Corporation, Neyagawa (JP)

(72) Inventor: Hiroshi Uehara, Neyagawa (JP)

(73) Assignee: Exedy Corporation, Neyagawa (JP)

( * ) Notice: Subject to any disclaimer, the term of this patent is extended or adjusted under 35 U.S.C. 154(b) by 224 days.

(21) Appl. No.: 17/191,462

(22) Filed: Mar. 3, 2021

(65) Prior Publication Data
US 2021/0310522 A1 Oct. 7, 2021

(30) Foreign Application Priority Data

Apr. 3, 2020 (JP) .............................. JP2020-067601

(51) Int. Cl.
*F16F 15/123* (2006.01)
*F16D 3/12* (2006.01)
*F16D 7/02* (2006.01)

(52) U.S. Cl.
CPC ............ *F16D 3/12* (2013.01); *F16F 15/1238* (2013.01); *F16F 15/12346* (2013.01); *F16F 15/12366* (2013.01); *F16D 7/025* (2013.01); *F16F 2230/007* (2013.01); *F16F 2232/02* (2013.01); *F16F 2236/08* (2013.01)

(58) Field of Classification Search
CPC ...... F16D 3/12; F16D 7/025; F16F 15/12346; F16F 15/12366; F16F 15/1238; F16F 2230/007; F16F 2232/02; F16F 2236/08

USPC .......................... 464/68.8; 192/213.2–213.22
See application file for complete search history.

(56) References Cited

U.S. PATENT DOCUMENTS 4,185,728 A * 1/1980 Gatewood ........... F16F 15/1238
464/68.8

FOREIGN PATENT DOCUMENTS

JP          2019-090428 A      6/2019

* cited by examiner

*Primary Examiner* — Greg Binda
(74) *Attorney, Agent, or Firm* — United IP Counselors, LLC

(57) ABSTRACT

A damper device includes first and second rotors, a first pre-damper, and a first main elastic member. The second rotor includes a hub and a flange. The first pre-damper elastically couples the hub and the flange in a rotational direction, and is actuated in a first range of torsion angle between the first and second rotors. The first main elastic member elastically couples the first and second rotors in the rotational direction, and is actuated in a greater second range of torsion angle. The first pre-damper includes first and second subordinate elastic members. The first subordinate elastic member is compressed in a neutral state, and urges the flange to a first side in the rotational direction with respect to the hub. The second subordinate elastic member is compressed in the neutral state, and urges the flange to a second side in the rotational direction with respect to the hub.

13 Claims, 10 Drawing Sheets

DAMPER DEVICE

CROSS-REFERENCE TO RELATED APPLICATIONS

This application claims priority to Japanese Patent Application No. 2020-067601, filed Apr. 3, 2020. The entire contents of that application are incorporated by reference herein in their entirety.

TECHNICAL FIELD

The present invention relates to a damper device.

BACKGROUND ART

A vehicle is embedded with a damper device in order to transmit power generated in an engine toward a transmission and attenuate rotational fluctuations.

Such a type of damper device includes an input rotor, an output rotor, and a plurality of coil springs. The plurality of coil springs are disposed in a plurality of window portions of the input rotor and a plurality of window holes of the output rotor, respectively, and elastically couple the input rotor and the output rotor in a rotational direction.

Besides, in some cases, the damper device is provided with a pre-damper unit as well as a main damper unit especially in order to inhibit vibration and noise in idling (e.g., Japan Laid-open Patent Application Publication No. 2019-90428).

In the pre-damper unit described in Japan Laid-open Patent Application Publication No. 2019-90428, an output-side rotor is composed of a hub having a tubular shape, a flange that has a disc-shape and is provided on the outer peripheral side of the hub, and a plurality of springs disposed between the hub and the flange. The hub is provided with a plurality of teeth on the outer periphery thereof. The teeth are engaged with a plurality of recesses provided on the inner peripheral surface of the flange. Gaps are produced circumferentially between each engaged pair of tooth and recess, whereby the hub and the flange are rotatable relative to each other by an angle corresponding to the gaps.

The pre-damper unit configured as described above has drawbacks such as production of noise attributed to wobble that could occur in a rotational direction depending on a relation between the length of each coil spring and the gaps produced between the hub and the flange.

BRIEF SUMMARY

It is an object of the present invention to inhibit a pre-damper unit from producing noise in a damper device.

(1) A damper device according to the present invention includes a first rotor, a second rotor, a first pre-damper, and a first main elastic member. The second rotor is rotatable relative to the first rotor and includes a hub having a tubular shape and a flange that is disposed on an outer peripheral side of the hub to be rotatable relative to the hub. The first pre-damper elastically couples the hub and the flange in a rotational direction and is actuated in a first range of torsion angle between the first rotor and the second rotor. The first main elastic member is disposed in a different position from the first pre-damper in a circumferential direction, elastically couples the first rotor and the second rotor in the rotational direction, and is actuated in a second range of torsion angle greater than the first range of torsion angle.

Besides, the first pre-damper includes a first subordinate elastic member and a second subordinate elastic member. The first subordinate elastic member is disposed in compression in a neutral state without relative rotation between the hub and the flange and urges the flange to a first side in the rotational direction with respect to the hub. On the other hand, the second subordinate elastic member is disposed in compression in the neutral state and urges the flange to a second side in the rotational direction with respect to the hub.

In the present device, the first pre-damper is actuated in the first range of torsion angle, i.e., when the torsion angle between the first rotor and the second rotor is small, such as in idling. On the other hand, the first main elastic member is actuated in the second range of torsion angle, i.e., when the torsion angle between the first rotor and the second rotor is large.

Here, in the first pre-damper, the first and second subordinate elastic members urge the flange to different sides in the rotational direction with respect to the hub, while being compressed between the hub and the flange. Because of this, in the neutral state, intervals produced between the hub and the flange are kept constant by the two subordinate elastic members, whereby it is possible to inhibit production of noise due to collision between the hub and the flange in, for instance, idling.

(2) Preferably, the first subordinate elastic member is further compressed when the hub is rotated to the first side in the rotational direction with respect to the flange. In this case, the second subordinate elastic member is further compressed when the hub is rotated to the second side in the rotational direction with respect to the flange.

(3) Preferably, the first subordinate elastic member expands when the hub is rotated to the second side in the rotational direction with respect to the flange. On the other hand, the second subordinate elastic member expands when the hub is rotated to the first side in the rotational direction with respect to the flange.

(4) Preferably, the hub includes a plurality of first engaging portions and a support portion on an outer peripheral surface thereof. In this case, the flange includes a plurality of second engaging portions and a holding cutout on an inner peripheral surface thereof. The plurality of second engaging portions are opposed to the plurality of first engaging portions at intervals in the circumferential direction. The holding cutout has a predetermined width and causes the support portion to be inserted therein.

Besides, the first subordinate elastic member is set in compression between the support portion and one end of the holding cutout. On the other hand, the second subordinate elastic member is set in compression between the support portion and the other end of the holding cutout.

(5) Preferably, the flange includes a first window hole accommodating the first main elastic member. Besides preferably, the damper device further includes a stopper mechanism restricting an angle of relative rotation between the first rotor and the second rotor to a predetermined angular range.

The stopper mechanism includes a first cutout, a second cutout, and two stop members. The first and second cutouts are provided in the flange. The two stop members are fixed to the first rotor. The first cutout is provided on one side of the first window hole in the circumferential direction so as to extend in the circumferential direction. The second cutout, made in shape of a hole, is provided on the other side of the first window hole in the circumferential direction so as to extend in the circumferential direction and communicates with the first window hole at one end thereof closer to the first window hole than the other end thereof. The two stop members are movable in the circumferential direction within the first cutout and the second cutout, respectively.

In the present damper device, the second cutout is communicated at the one end thereof with the first window hole. Because of this, the second cutout can be elongated in circumferential length. In other words, the actuation range of the stopper mechanism can be widened, whereby the angle of relative rotation (torsion angle) between the first and second rotors can be widened to one side in the rotational direction.

(6) Preferably, the first cutout is provided apart from the first window hole. In this case, the first cutout and the first window hole are provided apart from each other. Hence, degradation in strength of the flange can be inhibited in comparison with a configuration that the first cutout and the first window hole are communicated with each other.

(7) Preferably, the first cutout is provided in a circular-arc shape on a first pitch radius. In this case, the second cutout is provided in a circular-arc shape as the hole on a second pitch radius defined on an inner peripheral side of the first pitch radius.

Here, the pitch radius of the first cutout and that of the second cutout are set to be different from each other. Hence, the first and second cutouts, interposing therebetween the first window hole, are enabled to approach each other. In other words, an angle formed by a rotational axis and adjacent two cutouts can be set to approach 90 degrees, whereby inhomogeneity in strength of the first rotor and the flange can be inhibited.

(8) Preferably, the first window hole includes a protruding portion on one of pressing surfaces provided therein in the circumferential direction. The protruding portion protrudes to bulge in the circumferential direction from a radially middle part of the one of pressing surfaces. In this case, the first cutout protrudes toward the protruding portion at one end thereof located closer to the first window hole than the other end thereof.

Here, the first cutout can be extended at the one end thereof enough to cut into the protruding portion of the first window hole. Therefore, the first cutout can be elongated in circumferential length.

(9) Preferably, the damper device further includes a second main elastic member. (For both the first main elastic member and the second main elastic member, the term "main" is used to differentiate the elastic member from subordinate elastic members.) The second main elastic member is disposed radially outside the first pre-damper and elastically couples the first rotor and the second rotor in the rotational direction. In this case, the first rotor includes a pair of window portions, each of which is greater in circumferential length than the second main elastic member. The flange includes a pair of window holes, each of which accommodates the second main elastic member.

(10) Preferably, the damper device further includes a second pre-damper, a third main elastic member, and a fourth main elastic member. The second pre-damper is disposed in opposition to the first pre-damper through a rotational axis of the first rotor and elastically couples the hub and the flange in the rotational direction together with the first pre-damper. The third main elastic member is disposed in opposition to the first main elastic member through the rotational axis of the first rotor and elastically couples the first rotor and the second rotor in the rotational direction together with the first main elastic member. The fourth main elastic member is disposed in opposition to the second main elastic member through the rotational axis of the first rotor, while being disposed radially outside the second pre-damper, and elastically couple the first rotor and the second rotor in the rotational direction together with the second main elastic member.

Overall, according to the present invention described above, it is possible to inhibit production of noise in a pre-damper unit included in a damper device.

DETAILED DESCRIPTION

[Entire Configuration]

Figure 1:
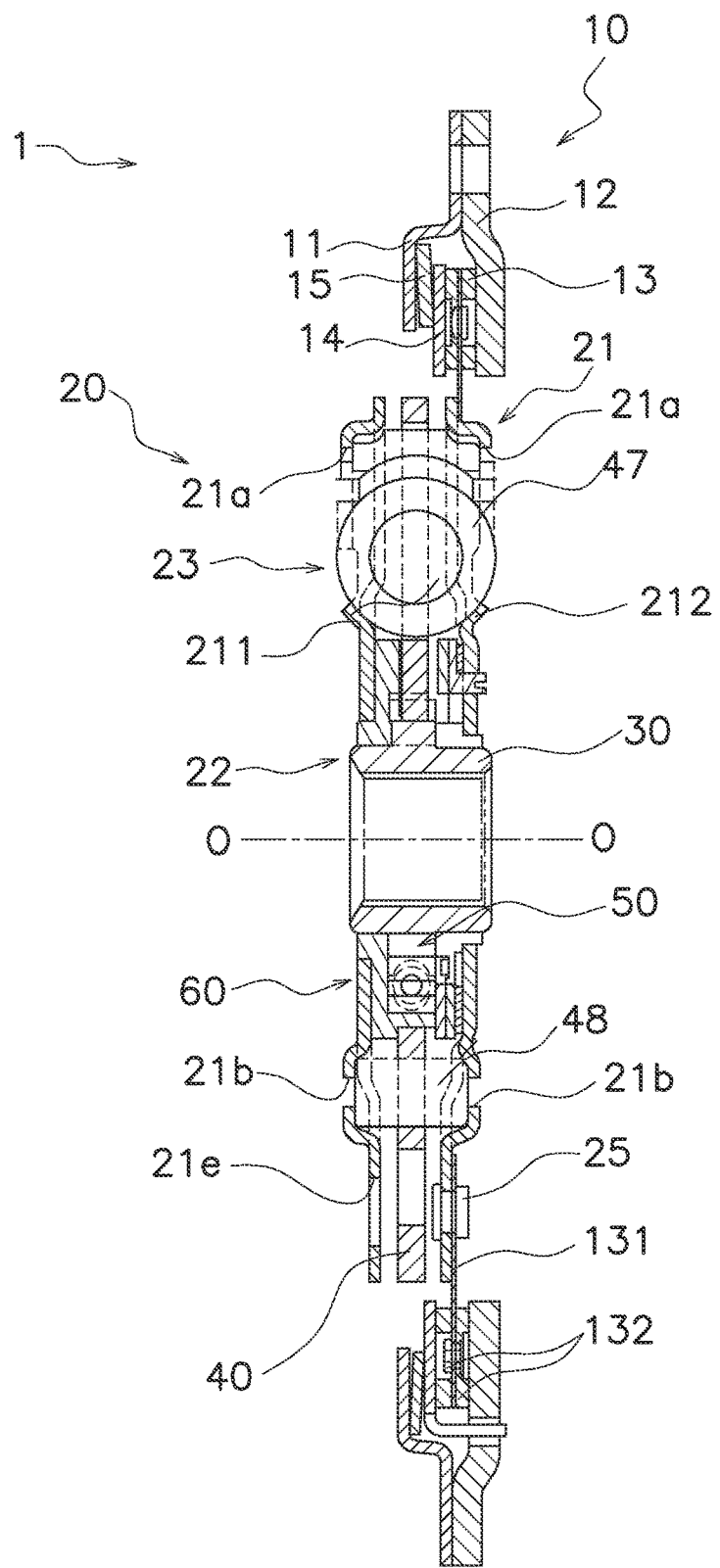
FIG. 1 is a cross-sectional view of a torque limiter embedded damper device according to a preferred embodiment of the present invention.
Figure 2:
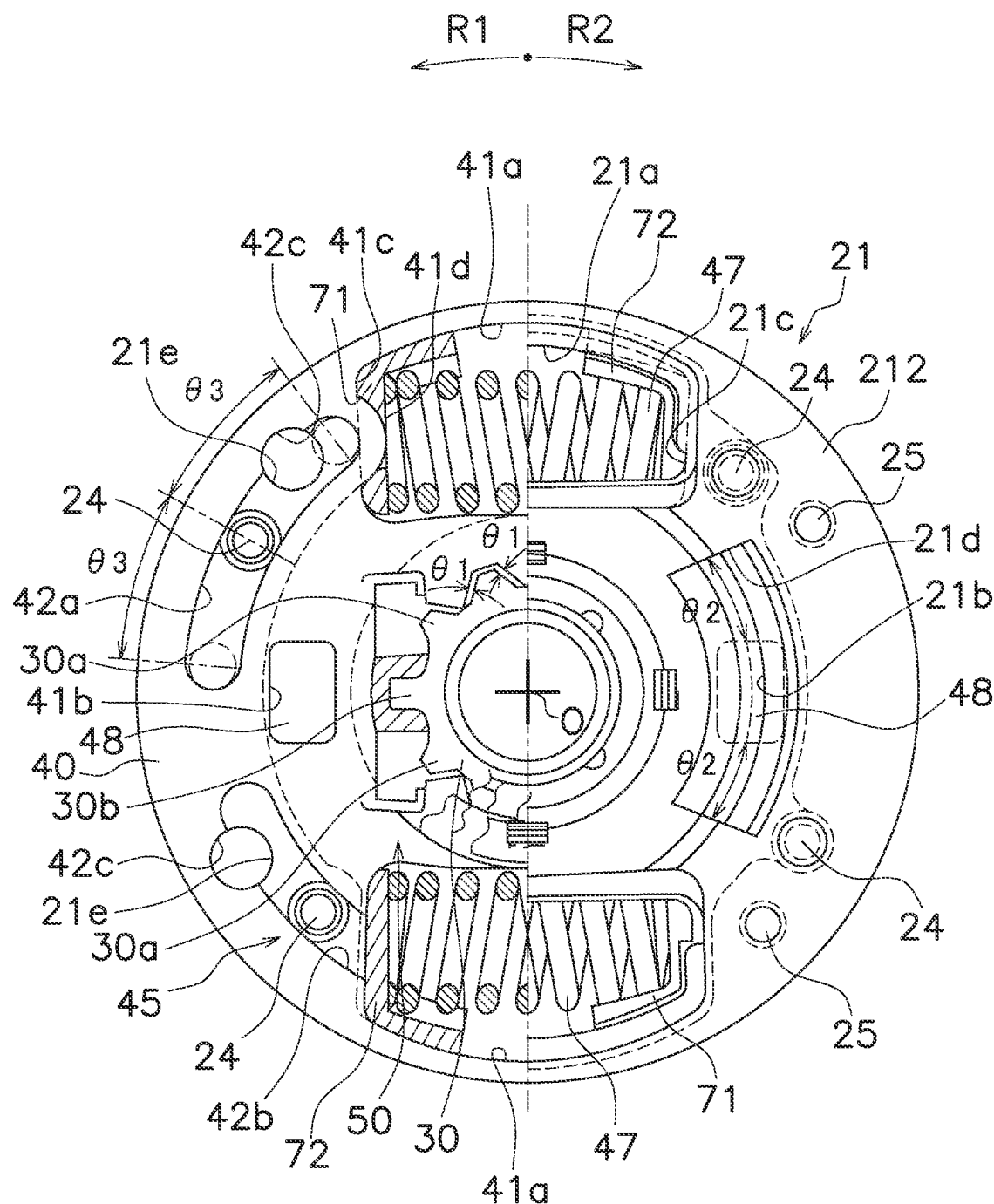
FIG. 2 is a front view of a damper unit.

FIG. 1 is a cross-sectional view of a torque limiter embedded damper device 1 (hereinafter simply referred to as "damper device 1" on an as-needed basis) according to a preferred embodiment of the present invention. On the other hand, FIG. 2 is a front view of the damper device 1 in a condition that some constituent members are detached therefrom or are not illustrated in part. In FIG. 1, line O-O indicates a rotational axis. In FIG. 1, an engine is disposed on the left side of the damper device 1, whereas a drive unit, including an electric motor, a transmission, and so forth, is disposed on the right side of the damper device 1.

It should be noted that in the following explanation, the term "axial direction" refers to an extending direction of the rotational axis O of the damper device 1. On the other hand, the term "circumferential direction" refers to a circumferential direction of an imaginary circle about the rotational axis O, whereas the term "radial direction" refers to a radial direction of the imaginary circle about the rotational axis O. It should be noted that the circumferential direction is not required to be perfectly matched with that of the imaginary circle about the rotational axis O, and is conceptualized as encompassing, for instance, a right-and-left direction defined based on a window portion and a window hole, both of which are illustrated in an upper part of FIG. 2. Likewise, the radial direction is not required to be perfectly matched with a diameter direction of the imaginary circle about the rotational axis O, and is conceptualized as encompassing, for instance, an up-and-down direction defined based on the window portion and the window hole, both of which are illustrated in the upper part of FIG. 2.

The damper device 1 is a device provided between a flywheel and an input shaft of the drive unit (both of which are not illustrated in the drawings) in order to limit a torque transmitted between the engine and the drive unit and attenuate rotational fluctuations. The damper device 1 includes a torque limiter unit 10 and a damper unit 20.

[Torque Limiter Unit 10]

The torque limiter unit 10 is disposed on the outer peripheral side of the damper unit 20. The torque limiter unit 10 limits a torque transmitted between the flywheel and the damper unit 20. The torque limiter unit 10 includes first and second side plates 11 and 12, a friction disc 13, a pressure plate 14, and a cone spring 15.

The first and second side plates 11 and 12 are fixed to each other by a plurality of rivets. The friction disc 13 includes a core plate 131 and a pair of friction members 132. The pressure plate 14 and the cone spring 15 are disposed between the first side plate 11 and the friction disc 13. The cone spring 15 presses the friction disc 13 onto the second side plate 12 through the pressure plate 14.

[Damper Unit 20]

The damper unit 20 is composed of an input-side plate 21 (exemplary first rotor), a hub flange 22 (exemplary second rotor), and a damper part 23 disposed between the input-side plate 21 and the hub flange 22.

<Input-Side Plate 21>

Figure 3:
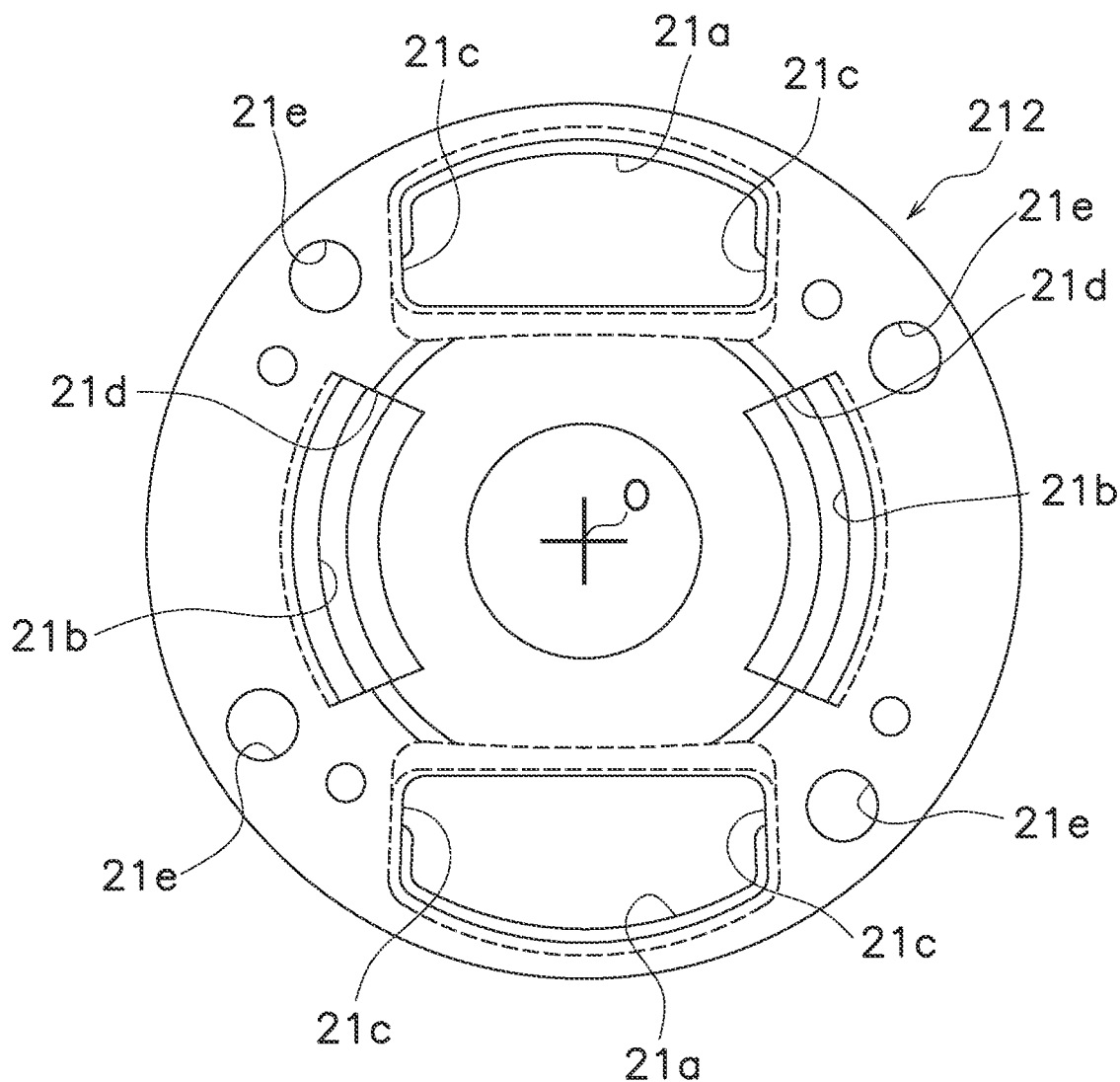
FIG. 3 is a front view of a second plate.

The input-side plate 21 includes a first plate 211 and a second plate 212 (both of which will be hereinafter collectively referred to as "the input-side plate 21" on an as-needed basis). As shown in FIG. 3, each of the first and second plates 211 and 212 is an annular member including a center hole. It should be noted that FIG. 3 depicts only the second plate 212 but the basic configuration of the second plate 212 is similarly true of the first plate 211. The first and second plates 211 and 212 are fixed to each other at a predetermined axial interval by four stop pins 24 (see FIG. 2). Therefore, the first and second plates 211 and 212 are immovable relative to each other in both axial and rotational directions. Besides, as shown in FIG. 1, the inner peripheral part of the core plate 131 in the friction disc 13 is fixed to the outer peripheral part of the second plate 212 by four rivets 25.

As shown in FIG. 3, each of the first and second plates 211 and 212 is provided with a pair of first window portions 21a and a pair of second window portions 21b. The pair of first window portions 21a is disposed in opposition to each other through the rotational axis O. FIG. 3 depicts the pair of first window portions 21a and the pair of second window portions 21b in the second plate 212 but the configurations of the window portions 21a and 21b are similarly true of those in the first plate 211. The pair of first window portions 21a is formed by cutting and raising each plate 211, 212. Each first window portion 21a includes a pair of pressing surfaces 21c on both circumferential end surfaces thereof and includes a pair of support portions on the outer and inner peripheral edges thereof. On the other hand, the pair of second window portions 21b is disposed in opposition to each other through the rotational axis O, while being displaced from the pair of first window portions 21a at an angular interval of 90 degrees. The pair of second window portions 21b is a pair of openings each having a circular-arc shape. Each second window portion 21b circumferentially extends and axially penetrates each plate 211, 212. Each second window portion 21b includes a pair of pressing surfaces 21d on both circumferential end surfaces thereof.

Besides, each of the first and second plates 211 and 212 is provided with four assembling holes 21e for swaging the rivets 25 in corresponding positions to the rivets 25.

<Hub Flange 22>

The hub flange 22 is a member for transmitting a torque, inputted thereto from the input-side plate 21, to an output-side device. As shown in FIGS. 1 and 2, the hub flange 22 includes a hub 30 and a flange 40.

The hub 30 is a tubular member and is disposed within the center holes of the first and second plates 211 and 212. The hub 30 is provided with a spline hole in the inner peripheral part thereof, whereby an output-side member is enabled to be spline-coupled to the spline hole. Besides, the hub 30 is provided with eight teeth 30a (exemplary first engaging portion) and a pair of protruding portions 30b (exemplary support portion) on the outer peripheral surface thereof. The pair of protruding portions 30b is disposed in opposition to each other through the rotational axis O.

Figure 4:
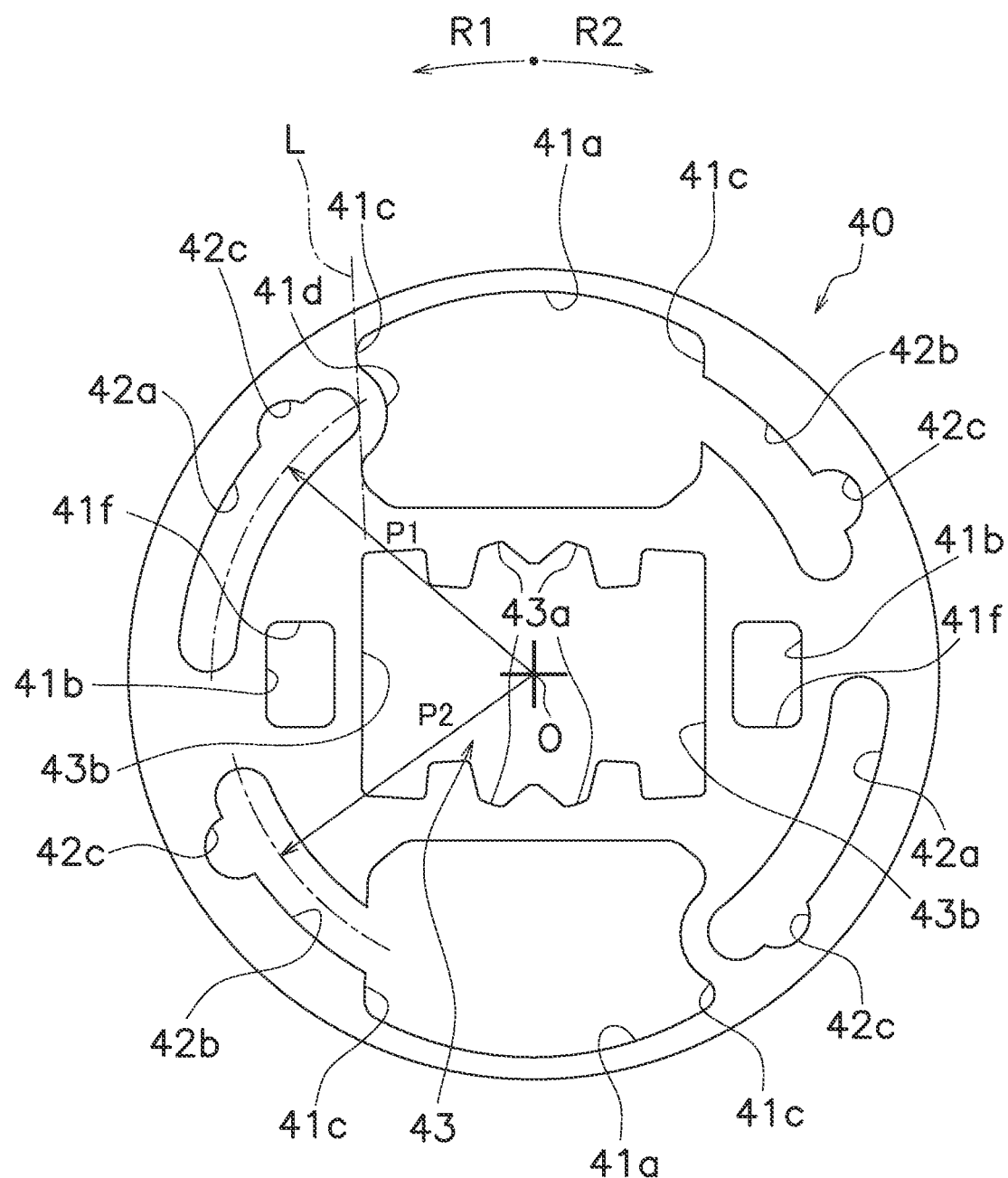
FIG. 4 is a front view of a flange.

The flange 40 is made in the shape of a disc as shown in FIGS. 2 and 4 and is disposed axially between the first plate 211 and the second plate 212. The flange 40 includes a pair of first window holes 41a, a pair of second window holes 41b, a pair of first stopper holes 42a (exemplary first cutout), and a pair of second stopper holes 42b (exemplary second cutout). Besides, the flange 40 is provided with an opening 43 in the center part thereof so as to enable the hub 30 to be inserted therein. The opening 43 is provided with eight engaging holes 43a (exemplary second engaging portion) and a pair of holding cutouts 43b on the inner peripheral surface thereof. It should be noted that four of the eight engaging holes 43a are communicated with the pair of holding cutouts 43b; each of the four is not made in the shape of a definite engaging hole.

The pair of first window holes 41a is disposed in opposition to each other through the rotational axis O, while being provided in corresponding positions to the pair of first window portions 21a of the first plate 211 and that of the second plate 212. Each first window hole 41a includes a pair of pressing surfaces 41c on both circumferential end surfaces thereof. Besides, in each first window hole 41a, circumferentially R1-side (hereinafter simply referred to as "R1 side") one of the pair of pressing surfaces 41c includes a protruding portion 41d protruding to bulge toward the other pressing surface 41c opposed thereto (i.e., so as to bulge in the circumferential direction).

The pair of second window holes 41b is disposed in opposition to each other through the rotational axis O, while being displaced from the pair of first window holes 41a at an angular interval of 90 degrees. In other words, the pair of second window holes 41b is provided in corresponding positions to the pair of second window portions 21b of the first plate 211 and that of the second plate 212. Each second window hole 41b is made in the shape of a rectangle, and a radial position of each second window hole 41b (the middle position of the radial width of the hole) is defined radially inside the radially center position in each first window hole 41a. Each second window hole 41b includes a pair of pressing surfaces 41f on both circumferential end surfaces thereof. The distance between the pair of pressing surfaces 41f is set to be shorter than that between the pair of pressing surfaces 21d of each second window portion 21b in the input-side plate 21.

As shown in FIG. 4, the pair of first stopper holes 42a is a pair of elongated holes each extending in a circular-arc shape on the R1 side of each first window hole 41a. Each first stopper hole 42a is provided apart from the first window hole 41a adjacent thereto. Each first stopper hole 42a extends, at one end thereof located apart from the adjacent first window hole 41a, to a position radially outside the second window hole 41b near thereto. On the other hand, each first stopper hole 42a extends, at the other end thereof located closer to the adjacent first window hole 41a, toward the protruding portion 41d in the adjacent first window hole 41a. Specifically, each first stopper hole 42a reaches a line segment L at the other end thereof located closer to the adjacent first window hole 41a. The line segment L is herein defined as an imaginary line segment connecting the outer and inner peripheral parts (not provided with the protruding portion 41d) of the end surface in each first window hole 41a.

The pair of second stopper holes 42b is a pair of elongated holes each extending in a circular-arc shape on a circumferentially R2 side (hereinafter simply referred to as "R2 side") of each first window hole 41a. Each second stopper hole 42b is communicated at the R1-side end thereof with the radially intermediate part of each first window hole 41a.

Besides, each of the first and second stopper holes 42a and 42b is provided with a cutout 42c on a part thereof located in the vicinity of the R2-side end thereof. The cutout 42c is curvedly recessed to the outer peripheral side. The cutouts 42c are provided in corresponding positions to the pairs of holes 21e provided in the input-side plate 21 to assemble the rivets 25, respectively. Each cutout 42c is similar in size to each assembling hole 21e. Each rivet 25 can be swaged through each cutout 42c and each pair of assembling holes 21e.

In the configuration described above, each first stopper hole 42a can be further elongated at the end thereof located closer to the adjacent first window hole 41a than in a configuration that the adjacent first window hole 41a is not provided with the protruding portion 41d. Besides, each second stopper hole 42b is communicated at one end thereof with the adjacent first window hole 41a. Hence, each second stopper hole 42b can be elongated in circumferential length as much as possible. As a result, the angle formed by the rotational axis O and each pair of stop pins 24 interposing therebetween each first window hole 41a can be set to approach 90 degrees.

Moreover, the first stopper holes 42a and the second stopper holes 42b are axially penetrated by the stop pins 24, respectively. Because of this, the input-side plate 21 and the hub flange 22 are rotatable relative to each other within a range that each stop pin 24 is movable within each stopper hole 42a, 42b. In other words, the stop pins 24 and the stopper holes 42a and 42b compose a stopper mechanism 45. The input-side plate 21 and the hub flange 22 are prevented from rotating relative to each other when each stop pin 24 makes contact with one end surface of each stopper hole 42a, 42b.

The radial positions of the pair of first window holes 41a are herein the same. However, a pitch radius P1 of each first stopper hole 42a (a radius at a radially middle part of each first stopper hole 42a) is greater than a pitch radius P2 of each second stopper hole 42b. In other words, the first stopper holes 42a and the second stopper holes 42b are provided in radial positions displaced from each other.

Because of this, each first stopper hole 42a can be extended at the R2-side end thereof toward the radially middle part (i.e., the protruding portion 41d) of the first window hole 41a adjacent thereto. On the other hand, each second stopper hole 42b can be communicated at the R1-side end thereof with the radially middle part of the first window hole 41a adjacent thereto.

As to four of the eight engaging holes 43a, two of the four are opposed to the remaining two through the rotational axis O. As shown in FIG. 2, four of the eight teeth 30a of the hub 30 are fitted to the four engaging holes 43a, respectively, while predetermined gaps (each corresponding to angle θ1) are produced on both circumferential sides of each tooth 30a with respect to each engaging hole 43a.

The pair of holding cutouts 43b is provided in positions displaced from the pair of first window holes 41a at 90 degrees (i.e., the same positions as the pair of second window holes 41b in the circumferential position). Each holding cutout 43b is made in the shape of a straight line in the circumferential direction and has a predetermined width. In other words, one end of each holding cutout 43b extends toward one of the pair of first window holes 41a, whereas the other end of each holding cutout 43b extends toward the other of the pair of first window holes 41a.

<Damper Part 23>

As shown in FIGS. 1 and 2, the damper part 23 includes a pair of large coil springs 47 (two first main elastic members, as recited in the claims), a pair of resin members 48 (two second main elastic members, as recited in the claims), a pair of pre-dampers 50 (exemplary first and second pre-dampers, as recited in the claims), and a hysteresis generating mechanism 60.

The pair of large coil springs 47 and the pair of resin members 48 compose a mechanism for elastically coupling the input-side plate 21 and the hub flange 22 in the rotational direction.

—Large Coil Springs 47 and Resin Members 48—

The large coil springs 47 are accommodated in the pair of first window holes 41a of the flange 40, respectively, whereas the resin members 48 are accommodated in the pair of second window holes 41b of the flange 40, respectively. Besides, the large coil springs 47 are axially and radially supported by the pair of first window portions 21a of each of the first and second plates 211 and 212, respectively, whereas the resin members 48 are axially and radially supported by the pair of second window portions 21b of each of the first and second plates 211 and 212, respectively.

It should be noted that as shown in FIG. 2, each resin member 48 is disposed in each second window portion 21b of the input-side plate 21 through circumferential gaps (each corresponding to angle θ2). On the other hand, each resin member 48 is disposed in each second window hole 41b of the flange 40 without any circumferential gap.

Figure 5:
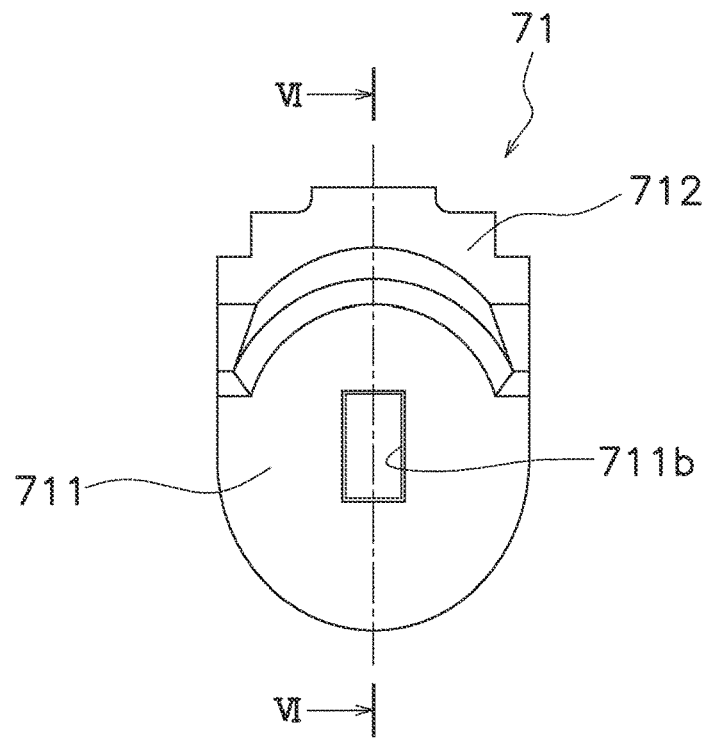
FIG. 5 is a side view of a first spring seat.
Figure 6:
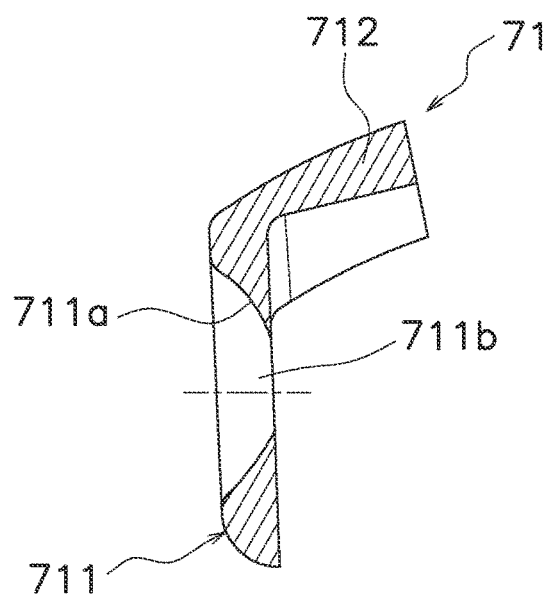
FIG. 6 is a cross-sectional view of FIG. 5 taken along line VI-VI.

A first spring seat 71 is provided on the R1-side end surface of each large coil spring 47. As shown in FIGS. 5 and 6, the first spring seat 71 includes an end surface support portion 711 and an outer periphery support portion 712. It should be noted that FIG. 5 is a side view of each first spring seat 71 (as seen from one side in the circumferential direction), whereas FIG. 6 is a cross-sectional view of FIG. 5 taken along line VI-VI.

The end surface support portion 711 supports the R1-side end surface of each large coil spring 47, while being supported by the R1-side pressing surface 21c of each first window portion 21a of the input-side plate 21 and the R1-side pressing surface 41c of each first window hole 41a of the flange 40. As shown in FIG. 6, the end surface support portion 711 is provided with a recess 711a, recessed in a circular-arc shape toward each large coil spring 47, on the surface thereof supported by the R1-side pressing surface 41c of each first window hole 41a. Besides, the recess 711a includes a hole 711b circumferentially penetrating a middle part thereof (i.e., a part located in the middle thereof in both radial and axial directions). Furthermore, the protruding portion 41d of each first window hole 41a of the flange 40 is fitted into the recess 711a.

The outer periphery support portion 712 is provided to extend from the outer peripheral end of the end surface support portion 711 in the circumferential direction. The outer periphery support portion 712 is disposed between the outer peripheral part of the R1-side end of each large coil spring 47 and both the inner peripheral surface of each first window portion 21a and that of each first window hole 41a. Because of this, even when each large coil spring 47 is moved to the outer peripheral side either by a centrifugal force or in compression, contact can be avoided between each large coil spring 47 and both each first window portion 21a and each first window hole 41a.

On the other hand, a second spring seat 72 is provided on the R2-side end surface of each large coil spring 47. In more detail, the second spring seat 72 supports the R2-side end surface of each large coil spring 47, while being supported by the R2-side pressing surface 21c of each first window portion 21a and the R2-side pressing surface 41c of each first window hole 41a. The second spring seat 72 is of a heretofore known type. Hence, detailed explanation thereof will be hereinafter omitted.

—Pre-Dampers 50—

Figure 7:
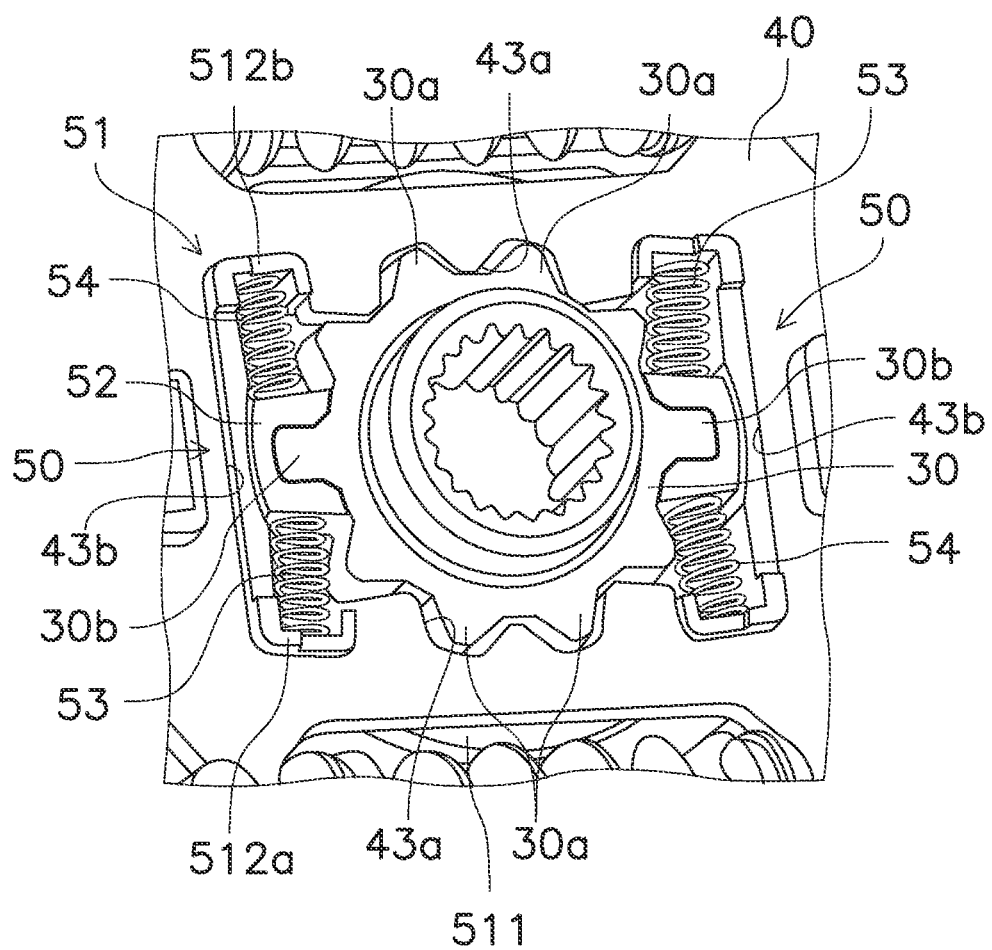
FIG. 7 is a partial front view of a pre-damper.

The pair of pre-dampers 50 composes a mechanism for elastically coupling the hub 30 and the flange 40 in the rotational direction. As shown in FIG. 2, the pair of pre-dampers 50 is disposed in opposition to each other through the rotational axis O. Each pre-damper 50 is disposed radially inside one of the pair of second window holes 41b, while being interposed between the pair of first window holes 41a. As shown in FIG. 7, each pre-damper 50 includes a spring holder 51, a receiver member 52, and first and second small coil springs 53 and 54 (each constituting an exemplary subordinate elastic member).

Figure 8:
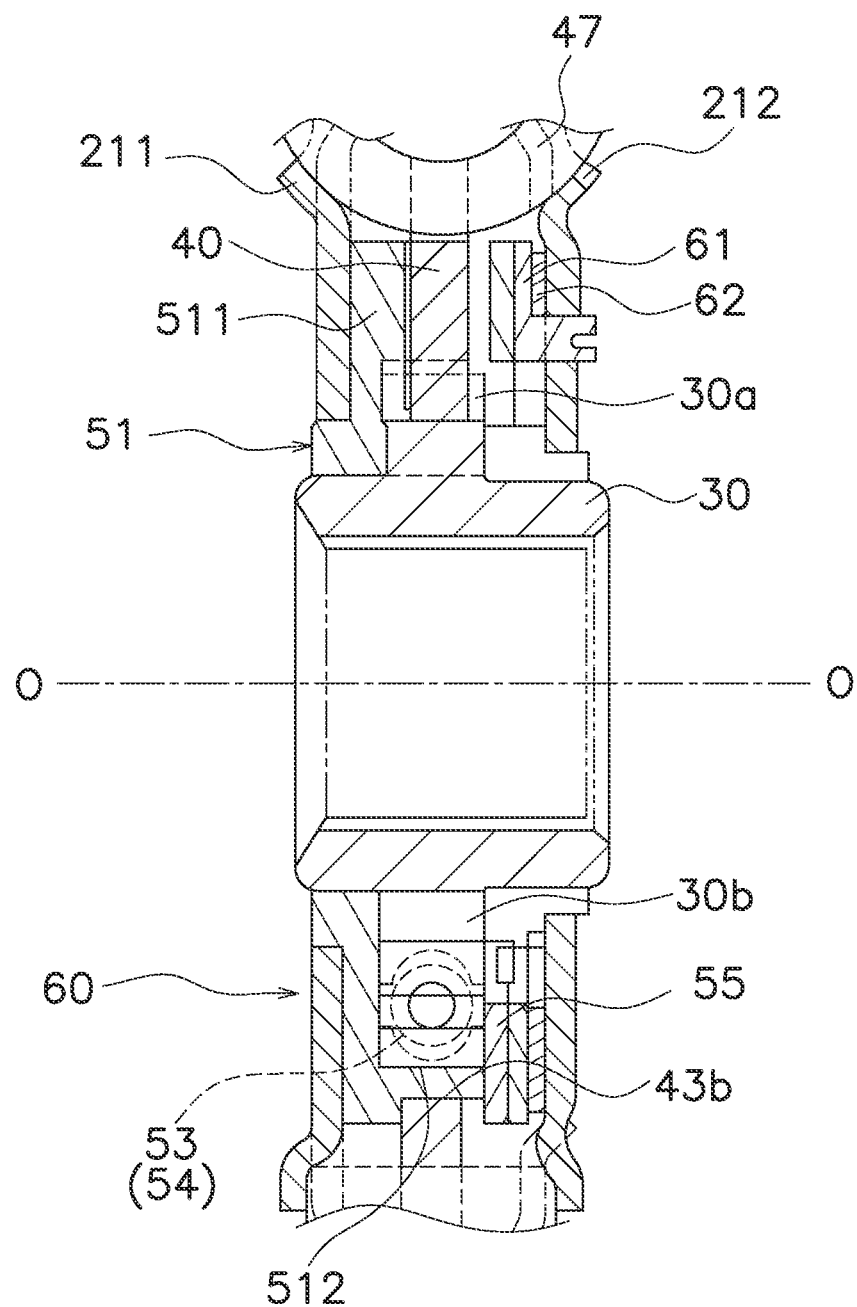
FIG. 8 is a partial enlarged view of FIG. 1.
Figure 9:
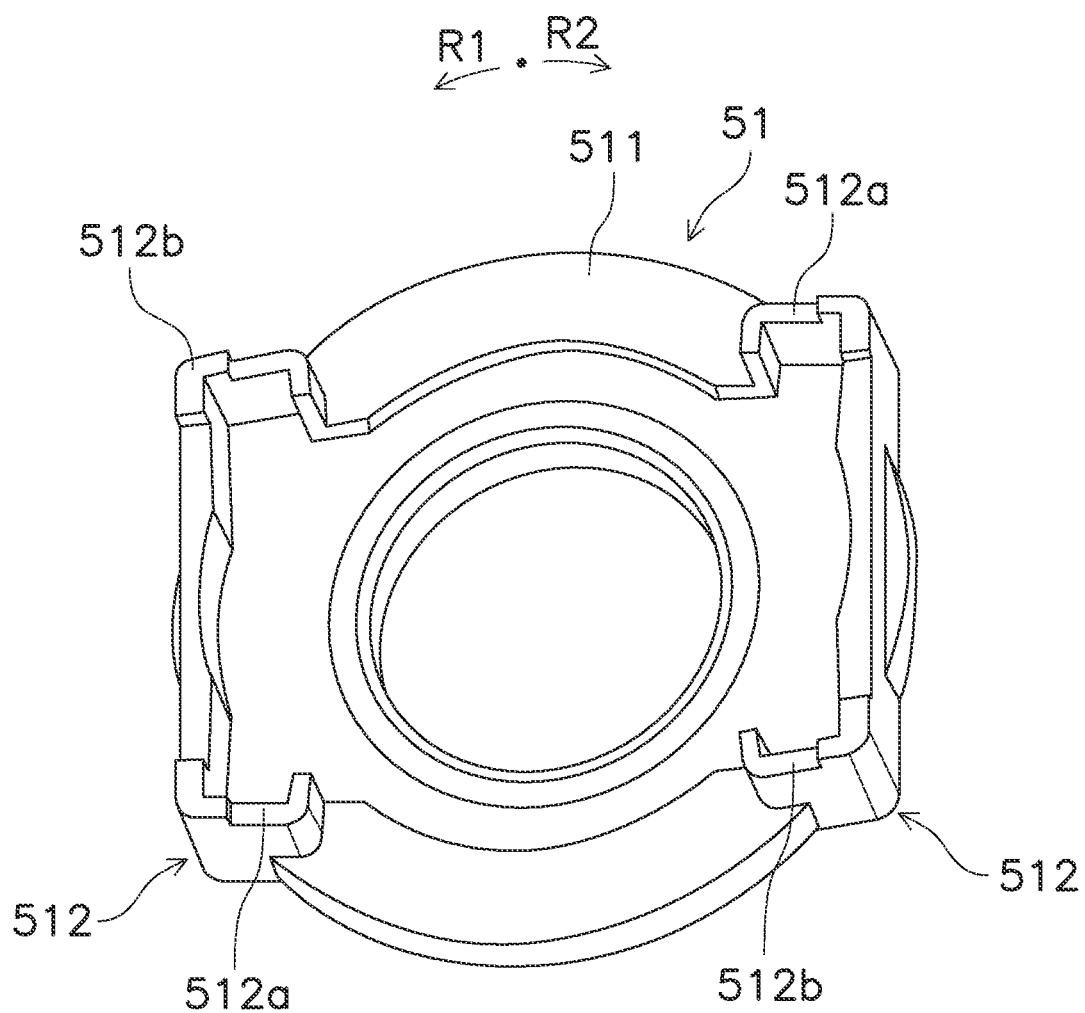
FIG. 9 is a front view of a spring holder.

As shown in FIG. 8 that is a close-up of part of FIG. 1, the spring holder 51 is disposed axially between the first plate 211 and the flange 40. As shown in FIG. 9, the spring holder 51 includes a disc portion 511, provided with a hole in the center part thereof, and a pair of support portions 512.

The disc portion 511 is supported at the inner peripheral surface thereof by the outer peripheral surface of the hub 30. As shown in FIG. 8, the teeth 30a and the pair of protruding portions 30b of the hub 30 and the inner peripheral part of the flange 40 make contact with the second plate 212-side lateral surface of the disc portion 511.

As shown in FIG. 9, the pair of support portions 512 is provided on the second plate 212-side lateral surface of the disc portion 511, while being opposed to each other through the rotational axis O. The pair of support portions 512 is similar in configuration to each other. Hence, explanation will be hereinafter provided only for one of the pair of support portions 512 and members related thereto.

The support portion 512 is provided to protrude from a lateral surface of the disc portion 511 toward the second plate 212. As shown in FIG. 7, the support portion 512 is provided between the inner peripheral ends of the pair of first window holes 41a, while extending at a predetermined width. The support portion 512 is fitted to one of the pair of holding cutouts 43b of the flange 40. Therefore, the flange 40 and the spring holder 51 are non-rotatable relative to each other. Besides, the support portion 512 includes a pair of spring receiver portions 512a and 512b in the vicinity of the inner peripheral ends of the pair of first window holes 41a. In more detail, the support portion 512 includes the spring receiver portion 512a on the R1-side end thereof and includes the spring receiver portion 512b on the R2-side end thereof. Besides, one of the pair of protruding portions 30b of the hub 30 is inserted into the center part of the support portion 512, i.e., the middle of the pair of spring receiver portions 512a and 512b opposed to each other.

Figure 10:
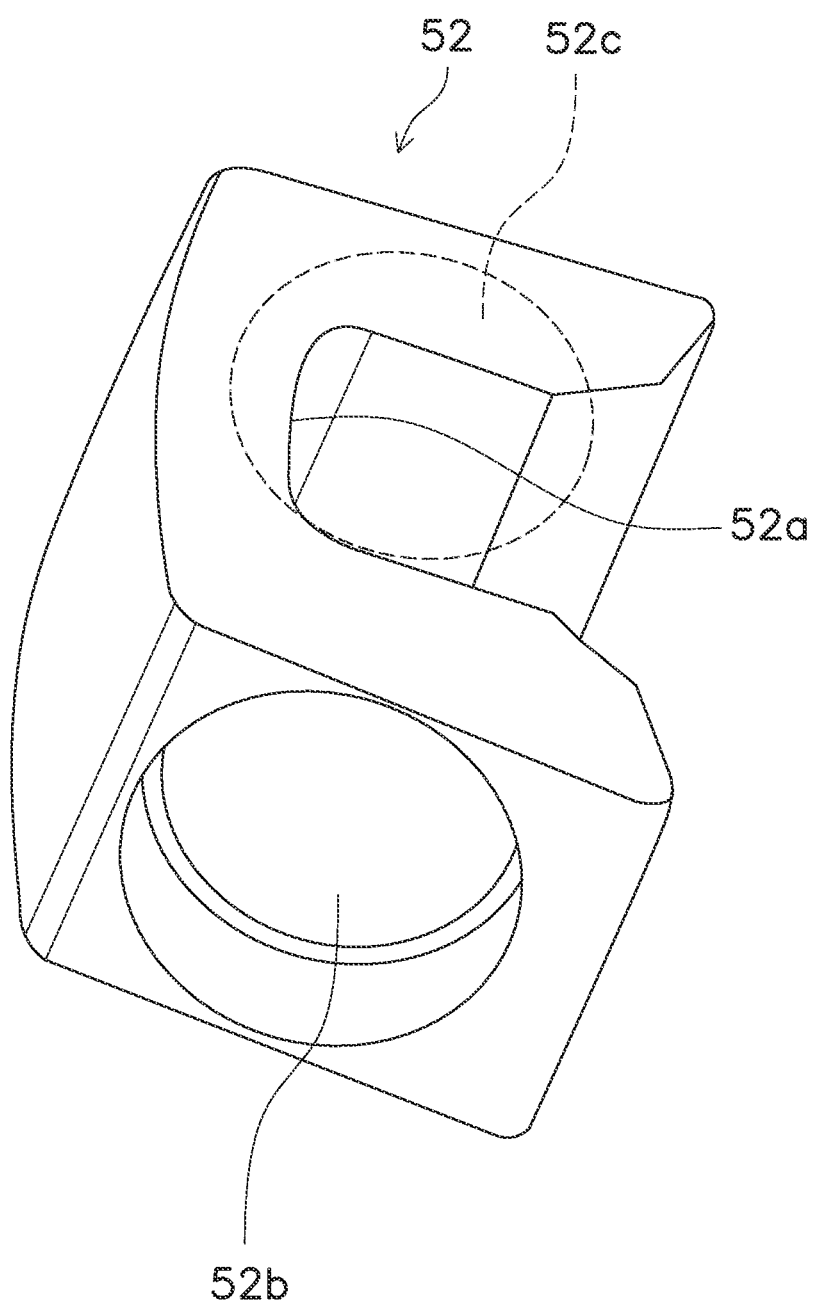
FIG. 10 is a perspective view of a receiver member.

As shown in FIGS. 7 and 10, the receiver member 52 is attached to one of the protruding portions 30b of the hub 30. The receiver member 52 is made in the shape of a block and includes an opening 52a opened to the inner peripheral side and a pair of spring holes 52b and 52c outwardly opened on both lateral surfaces thereof. The opening 52a is an opening into which one of the protruding portions 30b of the hub 30 is inserted. Each spring hole 52b, 52c has a bottom; each spring hole 52b, 52c does not penetrate the receiver member 52 in the circumferential direction. Besides, the first and second small coil springs 53 and 54 are disposed in compression between the receiver member 52 and the pair of receiver portions 512a and 512b of the spring holder 51.

One end surface of the first small coil spring 53 is supported by the R1-side receiver portion 512a of the spring holder 51, whereas the other end surface thereof is inserted into and supported by the spring hole 52b of the receiver member 52. On the other hand, one end surface of the second small coil spring 54 is supported by the R2-side receiver portion 512b of the spring holder 51, whereas the other end surface thereof is inserted into and supported by the spring hole 52c of the receiver member 52.

In such a configuration described above, the first small coil spring 53 urges the flange 40 to the R1 side with respect to the hub 30, whereas the second small coil spring 54 urges the flange 40 to the R2 side with respect to the hub 30.

It should be noted that each small coil spring 53, 54 in each pre-damper 50 has a lower stiffness than the large coil spring 47 disposed in each first window hole 41a. Therefore, when the damper part 23 is actuated, the respective small coil springs 53 and 54 in each pre-damper 50 are actuated in a small torsion angular range. After stop of the activation, the large coil springs 47 and the resin members 48 are actuated in a large torsion angular range.

Besides, as shown in FIG. 8, a cover 55 is disposed on the second plate 212-side lateral surface of the spring holder 51. In other words, the cover 55 is disposed axially between the second plate 212 and the end surface of the spring holder 51. The first and second small coil springs 53 and 54 are held in the interior of the support portion 512 of the spring holder 51 by the cover 55.

As shown in FIG. 8, the hysteresis generating mechanism 60 is disposed axially between the hub flange 22 and the first and second plates 211 and 212. The hysteresis generating mechanism 60 includes the spring holder 51 and the cover 55, and in addition, includes a bushing 61 and a cone spring 62. The bushing 61 and the cone spring 62 are disposed axially between the cover 55 and the second plate 212. The bushing 61 is non-rotatable relative to the second plate 212. The cone spring 62 is disposed in compression axially between the bushing 61 and the second plate 212.

With the configuration described above, when the hub 30 and the flange 40 are rotated relative to each other, a first hysteresis torque, which is relatively small in magnitude, is generated between the spring holder 51 and the hub 30. On the other hand, when the hub flange 22 and the first and second plates 211 and 212 are rotated relative to each other, a second hysteresis torque, which is relatively large in magnitude, is generated between the first plate 211 and the lateral surface of the spring holder 51 and between the cover 55 and the bushing 61.

[Assemblage of Torque Limiter Unit 10 and Damper Unit 20]

First, in assemblage of the damper device 1, the torque limiter unit 10 and the damper unit 20 are assembled separately. Thereafter, the inner peripheral part of the core plate 131 in the torque limiter unit 10 and the outer peripheral part of the second plate 212 are fixed to each other by swaging the rivets 25.

The first plate 211 is provided with the assembling holes 21e, whereas the flange 40 is provided with the assembling cutouts 42c. Hence, the rivets 25 can be herein swaged by a swaging tool contacted thereto by utilizing the pairs of hole 21e and cutout 42c.

[Actions]

A torque, transmitted from the engine to the flywheel, is inputted to the damper unit 20 through the torque limiter unit 10. In the damper unit 20, the torque is inputted to the input-side plate 21, to which the friction disc 13 of the torque limiter unit 10 is fixed, and is then transmitted to the hub flange 22 through the pre-dampers 50, the large coil springs 47, and the resin members 48. Subsequently, power is transmitted from the hub flange 22 to the electric motor, the transmission, a power generator, and so forth disposed on the output side.

Incidentally, for instance in starting the engine, chances are that an excessive torque is transmitted from the output side to the engine because the amount of inertia is large on the output side. In such a case, the magnitude of torque to be transmitted to the engine side is limited to a predetermined value or less by the torque limiter unit 10.

<Positive-Side Torsional Characteristics>

Explanation will be given for positive-side torsional characteristics obtained in the damper unit 20, namely, characteristics obtained when a torque is inputted from the engine (i.e., in input of a positive-side torque).

Now in each pre-damper 50, as described above, the first and second small coil springs 53 and 54 are disposed in compression and urge the flange 40 with respect to the hub 30 to the different sides in the rotational direction. Therefore, in a neutral state that a torsion angle is "0", the gaps, circumferentially produced between the hub 30 and the flange 40, are each kept at angle $\theta 1$, whereby noise attributed to wobble therebetween is not produced.

When the positive-side torque is inputted, the input-side plate 21 is rotated to the R1 side in the rotational direction as shown in FIG. 2. As described above, each large coil spring 47 is greater in stiffness than each of the first and second small coil springs 53 and 54. Therefore, when the torsion angle is less than $\theta 1$, each large coil spring 47 is not actuated (i.e., not compressed), the input-side plate 21 and the flange 40 are unitarily rotated.

Figure 11:
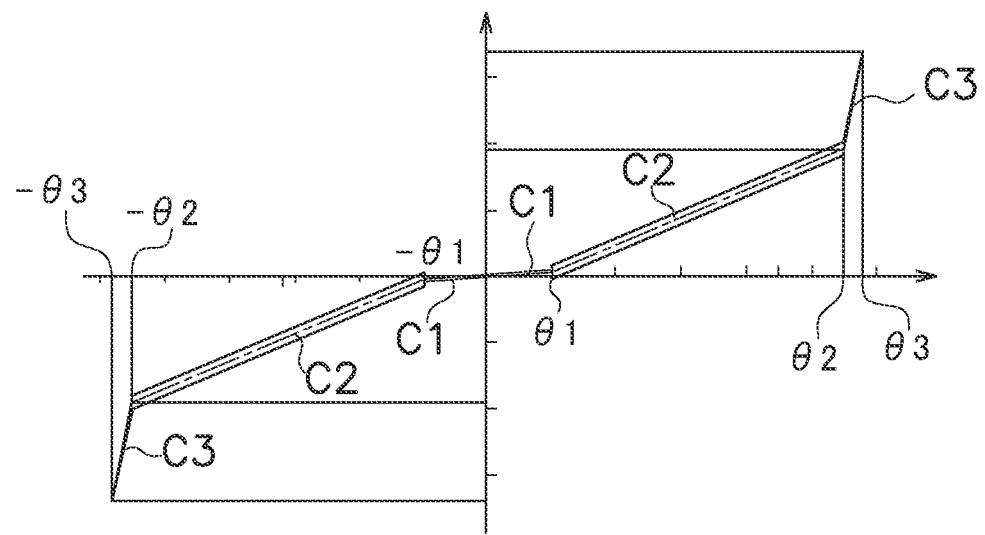
FIG. 11 is a chart showing torsional characteristics.

In this case, the flange 40 is rotated to the R1 side relative to the hub 30, whereby in each pre-damper 50, the second small coil spring 54 is further compressed and the first small coil spring 53 expands. Because of this, as shown in FIG. 11, low-stiffness torsional characteristic C1 is obtained until the torsion angle reaches $\theta 1$. It should be noted that the first small coil spring 53 herein expands to some extent but does not expand to the free length thereof, because the first small coil spring 53 is still in compression when the torsion angle is $\theta 1$. Besides, the hub 30 and the flange 40 are herein rotated relative to each other, whereby the first hysteresis torque, which is relatively small in magnitude, is generated therebetween.

When the torsion angle reaches $\theta 1$, the teeth 30a of the hub 30 make contact with the end surfaces of the engaging holes 43a of the flange 40, respectively. Because of this, the hub 30 and the flange 40 are unitarily rotated, whereby actuation of the two small coil springs 53 and 54 is stopped. In this case, each of the two large coil springs 47 is compressed between the second spring seat 72 supported by the R2-side pressing surface 21c of each first window portion 21a in the input-side plate 21 and the first spring seat 71 supported by the R1-side pressing surface 41c of each first window hole 41a in the flange 40.

It should be noted that as shown in FIG. 2, although each resin member 48 is supported by each second window hole 41b in the flange 40 without any gap in the neutral state, circumferential gaps, each corresponding to torsion angle $\theta 2$, are produced on the R1 and R2 sides of each resin member 48 in each second window portion 21b in the input-side plate 21. On the other hand, circumferential gaps, each corresponding to torsion angle $\theta 3$, are produced on the R1 and R2 sides of each stop pin 24 in each stopper hole 42a. Here, the circumferential gaps (hereinafter simply referred to as "gaps") are set to establish the following relation.

$\theta 2 < \theta 3$

Due to the gap settings described above, only each large coil spring 47 is compressed without compression of each resin member 48 until the torsion angle between the input-side plate 21 and the hub flange 22 reaches $\theta 2$ (it should be noted that the term "torsion angle" hereinafter refers to the torsion angle between the input-side plate 21 and the hub flange 22). When the torsion angle then exceeds $\theta 2$, each resin member 48 is compressed between the R2-side pressing surface 21d of each second window portion 21b the input-side plate 21 and the R1-side pressing surface 41f of each second window hole 41b in the flange 40. Because of this, as shown in FIG. 11, the positive-side torsional characteristics are obtained as follows: Characteristic C2 is obtained until the torsion angle reaches $\theta 2$ after reaching $\theta 1$; characteristic C3 is obtained after the torsion angle reaches $\theta 2$.

When the torsion angle then reaches $\theta 3$, each stop pin 24, disposed in each first stopper hole 42a, makes contact with the R1-side end surface of each first stopper hole 42a, whereby the input-side plate 21 and the hub flange 22 are prevented from rotating relative to each other.

<Negative-Side Torsional Characteristics>

Explanation will be given for negative-side torsional characteristics obtained in the damper unit 20, namely, characteristics obtained when a torque is inputted reversely from the drive unit (i.e., in input of a negative-side torque).

In a similar manner to the mechanism operating in the positive-side torsional characteristics explained above, before the torsion angle reaches $-\theta 1$, each large coil spring 47 is not actuated (i.e., not compressed), the input-side plate 21 and the flange 40 are unitarily rotated.

In this case, the hub 30 is rotated relative to the flange 40 to the R1 side, whereby in each pre-damper 50, the first small coil spring 53 is further compressed and the second small coil spring 54 expands. Because of this, as shown in FIG. 11, low-stiffness torsional characteristic C1 is obtained until the torsion angle reaches $-\theta 1$. It should be noted that the second small coil spring 54 herein expands to some extent but does not expand to the free length thereof, because the second small coil spring 54 is still in compression when the torsion angle is $-\theta 1$. Besides, the hub 30 and the flange 40 are herein rotated relative to each other, whereby the first hysteresis torque, which is relatively small in magnitude, is generated therebetween.

When the torsion angle reaches $-\theta 1$, the teeth 30a of the hub 30 make contact with the end surfaces of the engaging holes 43a of the flange 40, respectively. Because of this, the hub 30 and the flange 40 are unitarily rotated, whereby actuation of the two small coil springs 53 and 54 is stopped. In this case, each large coil spring 47 is compressed between the second spring seat 72 attached to the R2-side pressing surface 41c of each first window hole 41a in the hub flange 22 and the first spring seat 71 attached to the R1-side pressing surface 21c of each first window portion 21a in the input-side plate 21.

Each resin member 48 is actuated in a similar manner to when the positive-side torque is inputted. Specifically, each resin member 48 is not compressed until the torsion angle reaches $-\theta 2$; when or before the torsion angle reaches $-\theta 2$, low-stiffness torsional characteristic C2 is obtained as shown in FIG. 11. Then, after the torsion angle reaches −θ2, compression of each resin member 48 begins between the R2-side pressing surface 41f of each second window hole 41b in the hub flange 22 and the R1-side pressing surface 21d of each second window portion 21b in the input-side plate 21. Because of this, when the torsion angle exceeds −θ2, high-stiffness torsional characteristic C3 is obtained as shown in FIG. 11.

When the torsion angle reaches −θ3, each stop pin 24, disposed in each second stopper hole 42b, makes contact with the R2-side end surface of each second stopper hole 42b, whereby the input-side plate 21 and the hub flange 22 are prevented from rotating relative to each other.

[Features]

(1) In each pre-damper 50, the two small coil springs 53 and 54 are disposed in compression and urge the flange 40 with respect to the hub 30 to the different sides in the rotational direction. Because of this, in idling or so forth, it is possible to inhibit production of noise attributed to the gaps between the hub 30 and the flange 40.

(2) In the input-side plate 21, the circumferential length of each second window portion 21b is set to be greater than the width of each resin member 48. Because of this, the circumferential length of each second window hole 41b in the flange 40 can be set to be equivalent to the width of each resin members 48. As a result, it is possible to reliably provide the flange 40 with a space for installing each pre-damper 50 having a distinctive configuration.

(3) Each first spring seat 71 is provided with the recess 711a, and the protruding portion 41d provided in each first window hole 41a of the flange 40 is fitted into the recess 711a. Besides, the first stopper hole 42a, located adjacent to each first window hole 41a, extends at one end thereof toward the protruding portions 41d. Because of this, the first stopper hole 42a can be elongated in circumferential length. In other words, enlarging the torsion angle between the input-side plate 21 and the hub flange 40 (i.e., widening of angle) is made possible in comparison with a configuration that each spring seat is not provided with a recess, whereas a spring seat-side end surface of each window hole is made in the shape of a flat surface (without a protruding portion).

(4) Each second stopper hole 42b is communicated with the first window hole 41a adjacent thereto at the end thereof located closer to the adjacent first window hole 41a. Because of this, each second stopper hole 42b can be elongated in circumferential length, whereby enlarging the torsion angle between the input-side plate 21 and the hub flange 22 is made possible.

(5) Due to the same reason as the above, the stopper holes 42a and 42b, provided on both sides of each first window hole 41a in the flange 40, can be made close to each other. As a result, the angle formed by the rotational axis O and the stop pins 24 disposed on both sides of each first window hole 41a can be set to approach 90 degrees, whereby inhomogeneity in strength of the input-side plate 21 and the hub flange 22 can be inhibited.

(6) Each first window hole 41a is not communicated at one end thereof with the first stopper hole 42a adjacent thereto. Hence, degradation in strength of the flange 40 can be inhibited.

OTHER PREFERRED EMBODIMENTS

The present invention is not limited to the preferred embodiment described above, and a variety of changes or modifications can be made without departing from the scope of the present invention.

(a) In the preferred embodiment described above, the present invention has been applied to the damper device having three-stage torsional characteristics. However, the present invention is similarly applicable to a device having two-stage torsional characteristics. In this case, it is not required to provide the second window portions 21b, the second window holes 41b, and the resin members 48 in the preferred embodiment described above.

(b) In the preferred embodiment described above, each large coil spring 47 is provided with the spring seats 71 and 72 on both ends thereof, respectively. However, each large coil spring 47 may not be provided with these spring seats. Alternatively, each large coil spring 47 can be provided with a spring seat on only one end thereof.

(c) Components provided as the elastic members are not limited to two coil springs and two resin members. For example, all the components provided as the elastic members can be coil springs. Also, the number of the elastic members is not limited to a specific number.

(d) In the preferred embodiment described above, the present invention has been applied to the torque limiter embedded damper device but is similarly applicable to another type of damper device.

(e) Torsional characteristics are not limited to those shown in FIG. 11.

REFERENCE SIGNS LIST

21 Input-side plate (first rotor)
22 Hub flange (second rotor)
24 Stop pin
30 Hub
30a Tooth (first engaging portion)
30b Protruding portion (support portion)
40 Flange
41a First window hole
42a First stopper hole (first cutout)
42b Second stopper hole (second cutout)
43a Engaging hole (second engaging portion)
43b Holding cutout
45 Stopper mechanism
47 Large coil spring (first and third main elastic member)
48 Resin member (second and fourth main elastic member)
50 Pre-damper
53, 54 First and second small coil springs (first and second subordinate elastic members)

What is claimed is:

1. A damper device comprising:
a first rotor;
a second rotor rotatable relative to the first rotor, the second rotor including a hub and a flange, the hub having a tubular shape, the flange disposed on an outer peripheral side of the hub to be rotatable relative to the hub;
a first pre-damper configured to elastically couple the hub and the flange in a rotational direction, the first pre-damper actuated in a first range of torsion angle between the first rotor and the second rotor; and
a first main elastic member disposed in a different position from the first pre-damper in a circumferential direction, the first main elastic member configured to elastically couple the first rotor and the second rotor in the rotational direction, the first main elastic member actuated in a second range of torsion angle greater than the first range of torsion angle, wherein
the first pre-damper includes a first subordinate elastic member and a second subordinate elastic member, the first subordinate elastic member is compressed in a neutral state without relative rotation between the hub and the flange, the first subordinate elastic member configured to urge the flange to a first side in the rotational direction with respect to the hub, and the second subordinate elastic member is compressed in the neutral state, the second subordinate elastic member configured to urge the flange to a second side in the rotational direction with respect to the hub, the hub includes a plurality of first engaging portions and a support portion on an outer peripheral surface thereof, the flange includes a plurality of second engaging portions and a holding cutout on an inner peripheral surface thereof, the plurality of second engaging portions opposed to the plurality of first engaging portions at intervals in the circumferential direction, the holding cutout having a predetermined width, the holding cutout allowing the support portion to be inserted therein, the first subordinate elastic member is compressed between the support portion and a first end of the holding cutout, and the second subordinate elastic member is compressed between the support portion and a second end of the holding cutout, the first and second subordinate elastic members directly opposing each other across the support portion, whereby the flange is biased toward a neutral position relative to the hub when the flange and the hub are not subjected to a relative torque.

2. The damper device according to claim 1, wherein
the first subordinate elastic member is further compressed when the hub is rotated to the first side in the rotational direction with respect to the flange, and
the second subordinate elastic member is further compressed when the hub is rotated to the second side in the rotational direction with respect to the flange.

3. The damper device according to claim 1, wherein
the first subordinate elastic member expands when the hub is rotated to the second side in the rotational direction with respect to the flange, and
the second subordinate elastic member expands when the hub is rotated to the first side in the rotational direction with respect to the flange.

4. The damper device according to claim 1, further comprising:
a stopper mechanism configured to restrict an angle of relative rotation between the first rotor and the second rotor to a predetermined angular range, wherein
the flange includes a first window hole configured to accommodate the first main elastic member,
the stopper mechanism includes a first cutout, a second cutout, and two stop members, the first and second cutouts provided in the flange, the two stop members fixed to the first rotor,
the first cutout is provided on a first side of the first window hole in the circumferential direction so as to extend in the circumferential direction,
the second cutout is made in shape of a hole, the second cutout provided on a second side of the first window hole in the circumferential direction so as to extend in the circumferential direction, the second cutout communicating with the first window hole at a first end thereof closer to the first window hole than a second end thereof, and
the two stop members are movable in the circumferential direction within the first cutout and the second cutout respectively.

5. The damper device according to claim 4, wherein the first cutout is provided apart from the first window hole.

6. The damper device according to claim 5, wherein
the first cutout is provided in a circular-arc shape having a first pitch radius, and
the second cutout is provided in a circular-arc shape having a second pitch radius, the second pitch radius defined on an inner peripheral side of the first pitch radius.

7. The damper device according to claim 6, wherein
the first window hole includes a protruding portion on one of pressing surfaces provided therein in the circumferential direction, the protruding portion protruding to bulge in the circumferential direction from a radially middle part of the one of pressing surfaces, and
the first cutout protrudes toward the protruding portion at a first end thereof located closer to the first window hole than a second end thereof.

8. The damper device according to claim 1, further comprising:
a second main elastic member disposed radially outside the first pre-damper, the second main elastic member configured to elastically couple the first rotor and the second rotor in the rotational direction, wherein
the first rotor includes a pair of window portions each greater in circumferential length than the second main elastic member, and
the flange includes a pair of window holes each configured to accommodate the second main elastic member.

9. The damper device according to claim 8, further comprising:
a second pre-damper opposed to the first pre-damper through a rotational axis of the first rotor, the second pre-damper configured to elastically couple the hub and the flange in the rotational direction together with the first pre-damper;
a third main elastic member opposed to the first main elastic member through the rotational axis of the first rotor, the third main elastic member configured to elastically couple the first rotor and the second rotor in the rotational direction together with the first main elastic member; and
a fourth main elastic member opposed to the second main elastic member through the rotational axis of the first rotor, the fourth main elastic member disposed radially outside the second pre-damper, the fourth main elastic member configured to elastically couple the first rotor and the second rotor in the rotational direction together with the second main elastic member.

10. The damper device according to claim 9, wherein the first and third main elastic members comprise coil springs.

11. The damper device according to claim 9, wherein the second and fourth main elastic members comprise resin members.

12. The damper device according to claim 8, wherein the second main elastic member comprises a resin member.

13. The damper device according to claim 1, wherein the first main elastic member comprises a coil spring.

* * * * *